(12) United States Patent
Hwang et al.

(10) Patent No.: US 7,923,149 B2
(45) Date of Patent: Apr. 12, 2011

(54) POSITIVE ELECTRODE FOR RECHARGEABLE LITHIUM BATTERY AND RECHARGEABLE LITHIUM BATTERY INCLUDING SAME

(75) Inventors: Duck-Chul Hwang, Yongin-si (KR); Yong-Chul Park, Yongin-si (KR); Jeom-Soo Kim, Yongin-si (KR); Jae-Yul Ryu, Yongin-si (KR); Jong-Hwa Lee, Yongin-si (KR); Euy-Young Jung, Yongin-si (KR); So-Hyun Hur, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 814 days.

(21) Appl. No.: 11/940,042

(22) Filed: Nov. 14, 2007

(65) Prior Publication Data

US 2008/0118836 A1    May 22, 2008

(30) Foreign Application Priority Data

Nov. 21, 2006 (KR) .................. 10-2006-0115243

(51) Int. Cl.
*H01M 4/62* (2006.01)
*H01M 4/02* (2006.01)
*H01M 4/58* (2006.01)
*H01M 4/50* (2006.01)
*H01M 4/52* (2006.01)

(52) U.S. Cl. ........ 429/217; 429/221; 429/223; 429/209; 429/224; 429/233; 429/231.2

(58) Field of Classification Search ............ None
See application file for complete search history.

(56) References Cited

U.S. PATENT DOCUMENTS

| | | | | |
|---|---|---|---|---|
| 7,252,689 | B2 * | 8/2007 | Fujino et al. | 29/623.1 |
| 2005/0164084 | A1 * | 7/2005 | Adamson et al. | 429/220 |
| 2005/0196677 | A1 | 9/2005 | Lee et al. | |
| 2006/0228629 | A1 * | 10/2006 | Christian et al. | 429/231.1 |

FOREIGN PATENT DOCUMENTS

| | | |
|---|---|---|
| CN | 1459879 | 12/2003 |
| EP | 1 184 927 | 3/2002 |
| JP | 2002-216753 | 8/2002 |
| JP | 2006-032325 | 2/2006 |
| KR | 10-377320 | 3/2003 |
| KR | 10-0377857 | 3/2003 |
| KR | 2005-51306 | 6/2005 |
| KR | 2006-41649 | 5/2006 |

OTHER PUBLICATIONS

Cabot Corporation. "CAB-O-SIL® TS-530 Treated Fumed Silica". pp. 1-4. 2004.
English language abstract for Korean Patent Publication No. 2000-55679, 2000.

* cited by examiner

*Primary Examiner* — John S Maples
(74) *Attorney, Agent, or Firm* — Christie, Parker & Hale, LLP

(57) ABSTRACT

A positive electrode including a current collector; a positive active material layer disposed on the current collector; and a coating layer disposed on the positive active material layer. The coating layer includes a binder and a inorganic additive. The binder is a poly(vinylidenefluoride-hexafluoropropylene) copolymer comprising 2 to 16 mole % of hexafluoropropylene. The positive electrode for a rechargeable lithium battery suppresses side-reactions between a positive electrode and an electrolyte, at a high voltage.

15 Claims, 6 Drawing Sheets

POSITIVE ELECTRODE FOR RECHARGEABLE LITHIUM BATTERY AND RECHARGEABLE LITHIUM BATTERY INCLUDING SAME

CROSS-REFERENCE TO RELATED APPLICATIONS

This application claims the benefit of Korean Application No. 2006-115243, filed Nov. 21, 2006, in the Korean Intellectual Property Office, the disclosure of which is incorporated herein by reference.

BACKGROUND OF THE INVENTION

1. Field of the Invention

Aspects of the present invention relate to a positive electrode for a rechargeable lithium battery, and a rechargeable lithium battery including the same. More particularly, aspects of the present invention relate to a positive electrode for a rechargeable lithium battery that suppresses side-reactions between the positive electrode and an electrolyte.

2. Description of the Related Art

Lithium rechargeable batteries have recently become popular as power sources for small portable electronic devices. These batteries use an organic electrolyte solution, and thereby have twice the discharge voltage of a conventional battery using an alkaline aqueous solution, and accordingly, have a higher energy density.

Research into positive active materials for a rechargeable lithium battery has been conducted on lithium-transition element composite oxides that are capable of intercalating lithium, such as, $LiCoO_2$, $LiMn_2O_4$, $LiNiO_2$, $LiNi_{1-x}Co_xO_2$ (0<x<1), $LiMnO_2$, and the like.

As for a negative active material for a rechargeable lithium battery, various carbon-based materials such as artificial graphite, natural graphite, and hard carbon have been used, which can all intercalate and de-intercalate lithium ions. A graphite negative active material increases the discharge voltage and energy density of a battery because it has a low discharge potential of −0.2V, as compared to lithium. A battery using graphite as a negative active material has a high average discharge potential of 3.6V, and an excellent energy density. Furthermore, graphite is the most comprehensively used material, among the aforementioned carbon-based materials, because graphite guarantees a better cycle life for a battery, due to its outstanding reversibility. However, a graphite negative active material has a low density, and consequently a low capacity in terms of energy density per unit volume. Further, graphite has problems relating to explosion or combustion when a battery is misused or overcharged, and the like, because graphite is likely to react with an organic electrolyte at a high discharge voltage.

In order to solve these problems, a great deal of research on oxide negative electrodes has recently been performed. For example, amorphous tin oxide, developed by Japan Fuji Film Co., Ltd., has a high capacity per weight (800 mAh/g). However, this oxide has resulted in some critical defects, such as, a high initial irreversible capacity of up to 50%. Furthermore, some of the tin oxide has tended to be reduced into tin metal during the charging or discharging reaction, which limits its acceptance for use in a battery.

An example of another oxide negative electrode is the negative active material $Li_aMg_bVO_c$ (0.05≦a≦3, 0.12≦b≦2, 2≦2c−a−2b≦5), that is disclosed in Japanese Patent Publication No. 2002-216753.

However, such an oxide negative electrode does not show a sufficient battery performance, and therefore, a great deal of research into oxide negative materials has been conducted.

SUMMARY OF THE INVENTION

One embodiment of the present invention provides a positive electrode for a rechargeable lithium battery that suppresses side-reactions between a positive electrode and an electrolyte at a high voltage, and thereby realizes an excellent reliability and stability for a rechargeable lithium battery, at a high temperature. Another embodiment of the present invention provides a rechargeable lithium battery including the positive electrode.

According to various embodiments of the present invention, provided is a positive electrode that comprises a current collector, a positive active material layer disposed on the current collector and is capable of intercalating and de-intercalating lithium ions, and a coating layer disposed on the positive active material layer. The coating layer comprises a binder and a inorganic additive wherein, the binder may include a poly(vinylidenefluoride-hexafluoropropylene) (PVdF-HFP) copolymer comprising 2 to 16 mole % of hexafluoropropylene.

The poly(vinylidenefluoride-hexafluoropropylene) copolymer may include 6 to 14 mole % of hexafluoropropylene.

The inorganic additive may include at least one selected from the group consisting of carbon-based materials; oxides including at least one element selected from the group consisting of Al, Si, Sn, Fe, Ba, Zr, Ti, W, V, Mg, and combinations thereof; and combinations thereof.

The inorganic additive may include at least one selected from the group consisting of graphite, denka black, ketjen black, acetylene black, carbon nanotubes, carbon nanofiber, carbon nanowire, carbon nanoballs, activated carbon, colloidal silica, amorphous silica, fumed silica, colloidal alumina, amorphous alumina, tin oxide, titanium oxide, vanadium oxide, magnesium oxide, titanium sulfide ($TiS_2$), zirconium oxide ($ZrO_2$), iron oxide(FeO or $Fe_2O_3$), iron sulfide (FeS), iron titanate ($FeTiO_3$), barium titanate ($BaTiO_3$), and combinations thereof.

The inorganic additive may include a hydrophobic surface-treated silica.

The hydrophobic surface-treated silica may include a silica, and a hydrophobic surface-treatment layer disposed on the surface of the silica. The hydrophobic surface-treatment layer may include at least one surface-treatment compound selected from the group consisting of a substituted or unsubstituted silane-based compound, a substituted or unsubstituted siloxane-based compound, a substituted or unsubstituted silazane-based compound, and combinations thereof.

The surface treatment compound may include at least one selected from the group consisting of dimethyldichlorosilane (DDS), polydimethylsiloxane (PDMS), hexamethyldisilazane (HMDS), aminosilane (AS), alkylsilane (RS), octamethylcyclotetrasiloxane, and combinations thereof.

The hydrophobic surface-treated silica may have aliphatic CH peaks at 2925-2990 $cm^{-1}$ and 2881-2923 $cm^{-1}$, as found by infrared absorption spectroscopy.

The inorganic additive may have an average particle diameter of less than, or equal to, 2000 nm.

The inorganic additive may have an average particle diameter of 5 to 1000 nm.

The inorganic additive may be included in an amount of 20 to 4000 parts by weight, based on 100 parts by weight of the binder.

The inorganic additive may be included in an amount of 100 to 2000 parts by weight, based on 100 parts by weight of the binder.

The positive active material may be a compound selected from the group consisting of the compounds represented by the following Formulas 1 to 24:

$$Li_aA_{1-b}B_bD_2 \qquad \text{Formula 1}$$

wherein, in the above formula, $0.95 \leq a \leq 1.1$ and $0 \leq b \leq 0.5$, $$Li_aE_{1-b}B_bO_{2-c}F_c \qquad \text{Formula 2}$$

wherein, in the above formula, $0.95 \leq a \leq 1.1$, $0 \leq b \leq 0.5$, and $0 \leq c \leq 0.05$, $$LiE_{2-b}B_bO_{4-c}F_c \qquad \text{Formula 3}$$

wherein, in the above formula, $0 \leq b \leq 0.5$ and $0 \leq c \leq 0.05$, $$Li_aNi_{1-b-c}Co_bB_cD_\alpha \qquad \text{Formula 4}$$

wherein, in the above formula, $0.95 \leq a \leq 1.1$, $0 \leq b \leq 0.5$, and $0 \leq c \leq 0.05$, $0 < \alpha \leq 2$, $$Li_aNi_{1-b-c}Co_bB_cO_{2-\alpha}F_\alpha \qquad \text{Formula 5}$$

wherein, in the above formula, $0.95 \leq a \leq 1.1$, $0 \leq b \leq 0.5$, and $0 \leq c \leq 0.05$, $0 < \alpha < 2$, $$Li_aNi_{1-b-c}Co_bB_cO_{2-\alpha}F_2 \qquad \text{Formula 6}$$

wherein, in the above formula, $0.95 \leq a \leq 1.1$, $0 \leq b \leq 0.5$, and $0 \leq c \leq 0.05$, $0 < \alpha < 2$, $$Li_aNi_{1-b-c}Mn_bB_cD_\alpha \qquad \text{Formula 7}$$

wherein, in the above formula, $0.95 \leq a \leq 1.1$, $0 \leq b \leq 0.5$, and $0 \leq c \leq 0.05$, $0 < \alpha \leq 2$, $$Li_aNi_{1-b-c}Mn_bB_cO_{2-\alpha}F_\alpha \qquad \text{Formula 8}$$

wherein, in the above formula, $0.95 \leq a \leq 1.1$, $0 \leq b \leq 0.5$, $0 \leq c \leq 0.05$, and $0 < \alpha < 2$, $$Li_aNi_{1-b-c}Mn_bB_cO_{2-\alpha}F_2 \qquad \text{Formula 9}$$

wherein, in the above formula, $0.95 \leq a \leq 1.1$, $0 \leq b \leq 0.5$, $0 \leq c \leq 0.05$, and $0 < \alpha < 2$, $$Li_aNi_bE_cG_dO_2 \qquad \text{Formula 10}$$

wherein, in the above formula, $0.90 \leq a \leq 1.1$, $0 \leq b \leq 0.9$, $0 \leq c \leq 0.9$, and $0.001 \leq d \leq 0.2$, $$Li_aNi_bCo_cMn_dG_eO_2 \qquad \text{Formula 11}$$

wherein, in the above formula, $0.90 \leq a \leq 1.1$, $0 \leq b \leq 0.9$, $0 \leq c \leq 0.5$, $0 \leq d \leq 0.5$, and $0.001 \leq e \leq 0.2$, $$Li_aNiG_bO_2 \qquad \text{Formula 12}$$

wherein, in the above formula, $0.90 \leq a \leq 1.1$ and $0.001 \leq b \leq 0.1$, $$Li_aCoG_bO_2 \qquad \text{Formula 13}$$

wherein, in the above formula, $0.90 \leq a \leq 1.1$ and $0.001 \leq b \leq 0.1$, $$Li_aMnG_bO_2 \qquad \text{Formula 14}$$

wherein, in the above formula, $0.90 \leq a \leq 1.1$ and $0.001 \leq b \leq 0.1$, $$Li_aMn_2G_bO_4 \qquad \text{Formula 15}$$

wherein, in the above formula, $0.90 \leq a \leq 1.1$ and $0.001 \leq b \leq 0.2$, $$QO_2, \qquad \text{Formula 16}$$

$$QS_2, \qquad \text{Formula 17}$$

$$LiQS_2, \qquad \text{Formula 18}$$

$$V_2O_5, \qquad \text{Formula 19}$$

$$LiV_2O_5, \qquad \text{Formula 20}$$

$$LiIO_2, \qquad \text{Formula 21}$$

$$LiNiVO_4, \qquad \text{Formula 22}$$

$$Li_{3-f}J_2(PO_4)_3 (0 \leq f \leq 3), \text{ and} \qquad \text{Formula 23}$$

$$Li_{3-f}Fe_2(PO_4)_3 (0 \leq f \leq 2), \qquad \text{Formula 24}$$

wherein, in the above Formulas 1 to 24, A is selected from the group consisting of Ni, Co, Mn, and combinations thereof; B is selected from the group consisting of Al, Ni, Co, Mn, Cr, Fe, Mg, Sr, V, a rare earth element, and combinations thereof; D is selected from the group consisting of O, F, S, P, and combinations thereof; E is selected from the group consisting of Co, Mn, and combinations thereof; F is selected from the group consisting of F, S, P, and combinations thereof; G is a transition element or a lanthanide element selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, Fe, La, Ce, Sr, and combinations thereof; Q is a transition element selected from the group consisting of Ti, Mo, Mn, and combinations thereof; I is a transition element selected from the group consisting of Cr, V, Fe, Sc, Y, and combinations thereof; and J is a transition element selected from the group consisting of V, Cr, Mn, Co, Ni, Cu, and combinations thereof.

The positive electrode may have an active mass density of at least 3.5 g/cc.

According to another embodiment of the present invention, provided is a rechargeable lithium battery including one of the above positive electrodes, a negative electrode including a negative active material capable of intercalating and de-intercalating lithium ions, and a non-aqueous electrolyte including a non-aqueous organic solvent and a lithium salt.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
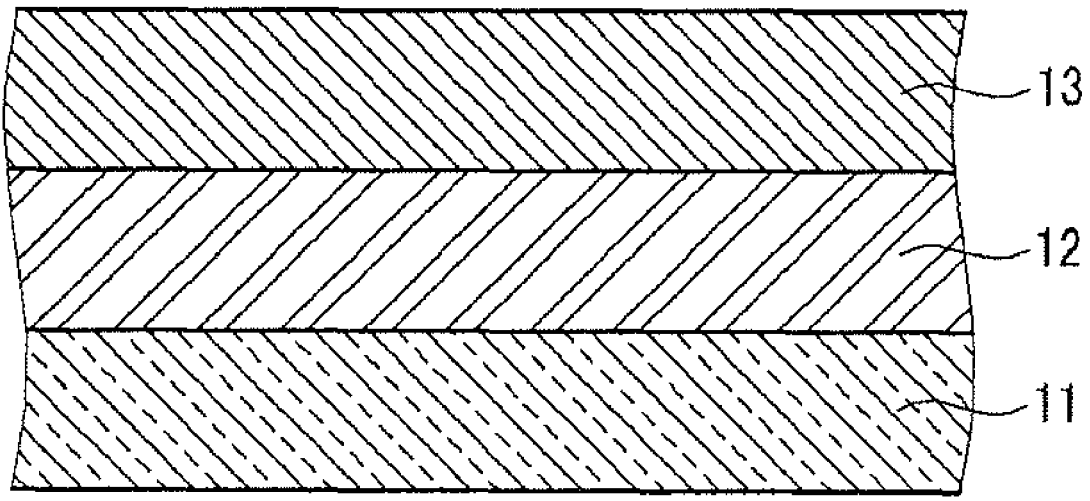
FIG. 1 is a schematic cross-sectional view of a positive electrode for a rechargeable lithium battery according to one embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The $LiCoO_2$ that is currently used as a positive active material for a rechargeable lithium battery has a small capacity of 160 mAh/g, when used in a coin-type cell. Therefore, it is generally unsuitable for use in a high-capacity battery. As a substitute for the $LiCoO_2$, high-capacity nickel-based compounds have been researched for use as a positive active material for a battery. However, these nickel-base compounds have not been commercially available because they have various problems in terms of safety, high rate characteristics, high temperature characteristics, and so on. Raising a cut-off voltage for $LiCoO_2$ has been studied, but problems have arisen due to a reactivity increase between an electrolyte and an active material surface at a high voltage, the thermal stability of cobalt-based compounds, and so on.

In order to improve the thermal stability of an active material at charge and discharge, various metal elements are doped with an active material, which increases the structural stability of the active material during high voltage charging and discharging, but does not inhibit the reactivity between an active material surface and an electrolyte.

Coating an active material with various oxides or alkoxides has been suggested to suppress reactivity between the surface of an active material and an electrolyte, but this is not effective in terms of thermal stability. Particularly, such a coating does not produce a single-phase surface-treatment reaction product, and it produces a material capable of performing side-reactions with an electrolyte, and thereby possibly deteriorating the high temperature storage characteristics.

According to one embodiment of the present invention, a coating layer, comprising a binder and a inorganic additive, is disposed on a positive active material layer, and thereby side-reactions between a positive electrode and an electrolyte, at a high voltage, are suppressed, resulting in improved high temperature reliability and safety.

FIG. 1 is a schematic cross-sectional view of a positive electrode for a rechargeable lithium battery according to one embodiment of the present invention.

Referring to FIG. 1, a positive electrode 10, for a rechargeable lithium battery, includes a current collector 11, a positive active material layer 12 disposed on the current collector 11, and a coating layer 13 disposed on the positive active material layer 12.

The current collector 11 may be selected from the group consisting of aluminum foil, nickel foil, stainless steel foil, titanium foil, nickel foam, aluminum foam, a polymer substrate coated with a conductive metal, and combinations thereof. According to one embodiment, aluminum foil may be appropriate.

The positive active material layer 12 comprises a positive active material capable of performing electrochemical redox reactions.

The positive active material may be a lithiated intercalation compound capable of intercalating and de-intercalating lithium ions. Specific examples of the lithiated intercalation compound may be a composite oxide including lithium and a metal selected from the group consisting of cobalt, manganese, nickel, and combinations thereof. The lithiated intercalation compound may be a compound selected from the group consisting of the compounds represented by the following Formulas 1 to 24.

$$Li_aA_{1-b}B_bD_2 \qquad \text{Formula 1}$$

wherein, in the above formula, $0.95 \leq a \leq 1.1$ and $0 \leq b \leq 0.5$, $$Li_aE_{1-b}B_bO_{2-c}F_c \qquad \text{Formula 2}$$

wherein, in the above formula, $0.95 \leq a \leq 1.1$, $0 \leq b \leq 0.5$, and $0 \leq c \leq 0.05$, $$LiE_{2-b}B_bO_{4-c}F_c \qquad \text{Formula 3}$$

wherein, in the above formula, $0 \leq b \leq 0.5$ and $0 \leq c \leq 0.05$, $$Li_aNi_{1-b-c}Co_bB_cD_\alpha \qquad \text{Formula 4}$$

wherein, in the above formula, $0.95 \leq a \leq 1.1$, $0 \leq b \leq 0.5$, and $0 \leq c \leq 0.05$, $0 < \alpha < 2$, $$Li_aNi_{1-b-c}Co_bB_cO_{2-\alpha}F_\alpha \qquad \text{Formula 5}$$

wherein, in the above formula, $0.95 \leq a \leq 1.1$, $0 \leq b \leq 0.5$, and $0 \leq c < 0.05$, $0 < \alpha \leq 2$, $$Li_aNi_{1-b-c}Co_bB_cO_{2-\alpha}F_2 \qquad \text{Formula 6}$$

wherein, in the above formula, $0.95 \leq a \leq 1.1$, $0 \leq b \leq 0.5$, and $0 \leq c \leq 0.05$, $0 < \alpha < 2$, $$Li_aNi_{1-b-c}Mn_bB_cD_\alpha \qquad \text{Formula 7}$$

wherein, in the above formula, $0.95 \leq a \leq 1.1$, $0 \leq b \leq 0.5$, and $0 \leq c \leq 0.05$, $0 < \alpha \leq 2$, $$Li_aNi_{1-b-c}Mn_bB_cO_{2-\alpha}F_\alpha \qquad \text{Formula 8}$$

wherein, in the above formula, $0.95 \leq a \leq 1.1$, $0 \leq b \leq 0.5$, $0 \leq c \leq 0.05$, and $0 < \alpha < 2$, $$Li_aNi_{1-b-c}Mn_bB_cO_{2-\alpha}F_2 \qquad \text{Formula 9}$$

wherein, in the above formula, $0.95 \leq a \leq 1.1$, $0 \leq b \leq 0.5$, $0 \leq c \leq 0.05$, and $0 < \alpha < 2$, $$Li_aNi_bE_cG_dO_2 \qquad \text{Formula 10}$$

wherein, in the above formula, $0.90 \leq a \leq 1.1$, $0 \leq b \leq 0.9$, $0 \leq c \leq 0.9$, and $0.001 \leq d \leq 0.2$, $$Li_aNi_bCo_cMn_dG_eO_2 \qquad \text{Formula 11}$$

wherein, in the above formula, $0.90 \leq a \leq 1.1$, $0 \leq b \leq 0.9$, $0 \leq c \leq 0.5$, $0 \leq d \leq 0.5$, and $0.001 \leq e \leq 0.2$, $$Li_aNiG_bO_2 \qquad \text{Formula 12}$$

wherein, in the above formula, $0.90 \leq a \leq 1.1$ and $0.001 \leq b \leq 0.1$, $$Li_aCoG_bO_2 \qquad \text{Formula 13}$$

wherein, in the above formula, $0.90 \leq a \leq 1.1$ and $0.001 \leq b \leq 0.1$, $$Li_aMnG_bO_2 \qquad \text{Formula 14}$$

wherein, in the above formula, $0.90 \leq a \leq 1.1$ and $0.001 \leq b \leq 0.1$, $$Li_aMn_2G_bO_4 \qquad \text{Formula 15}$$

wherein, in the above formula, $0.90 \leq a \leq 1.1$ and $0.001 \leq b \leq 0.2$, $$QO_2, \qquad \text{Formula 16}$$

$$QS_2, \qquad \text{Formula 17}$$

$$LiQS_2, \qquad \text{Formula 18}$$

$$V_2O_5, \qquad \text{Formula 19}$$

| | |
|---|---|
| LiV$_2$O$_5$, | Formula 20 |
| LiIO$_2$, | Formula 21 |
| LiNiVO$_4$, | Formula 22 |
| Li$_{3-f}$J$_2$(PO$_4$)$_3$(0≤f≤3), and | Formula 23 |
| Li$_{3-f}$Fe$_2$(PO$_4$)$_3$(0≤f≤2), | Formula 24 | wherein, in the above Formulas 1 to 24, A is selected from the group consisting of Ni, Co, Mn, and combinations thereof; B is selected from the group consisting of Al, Ni, Co, Mn, Cr, Fe, Mg, Sr, V, a rare earth element, and combinations thereof; D is selected from the group consisting of O, F, S, P, and combinations thereof; E is selected from the group consisting of Co, Mn, and combinations thereof; F is selected from the group consisting of F, S, P, and combinations thereof; G is a transition element or a lanthanide element selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, Fe, La, Ce, Sr, and combinations thereof; Q is selected from the group consisting of Ti, Mo, Mn, and combinations thereof; I is selected from the group consisting of Cr, V, Fe, Sc, Y, and combinations thereof; and J is selected from the group consisting of V, Cr, Mn, Co, Ni, Cu, and combinations thereof.

The positive active material may be at least one selected from the group consisting of elemental sulfur (S$_8$), and a sulfur-based compound such as Li$_2$Sn(n≥1), Li$_2$Sn(n≥1), dissolved in a catholyte, an organic sulfur compound, or a carbon-sulfur polymer ((C$_2$S$_f$)$_n$: f=2.5 to 50, n≥2).

The positive active material layer 12 also comprises a binder for improving adherence between the positive active material layer 12, and a current collector 11, or a conductive material for improving electrical conductivity.

The binder may be selected from the group consisting of polyvinylchloride, polyvinylfluoride, an ethylene oxide-containing polymer, polyvinylalcohol, carboxylated polyvinylchloride, polyvinylidenefluoride, a polyimide, polyurethane, an epoxy resin, nylon, carboxylmethyl cellulose, hydroxypropyl cellulose, diacetyl cellulose, polyvinyl pyrrolidone, polytetrafluoroethylene, styrene-butadiene rubber, acrylated styrene-butadiene rubber, copolymers thereof, and combinations thereof.

Any electrically conductive material can be used as a conductive material unless it causes any chemical change. Examples of the conductive material comprise natural graphite, artificial graphite, carbon black, acetylene black, ketjen black, a carbon fiber, a metal powder or a metal fiber including copper, nickel, aluminum, silver, and so on, or a polyphenylene derivative.

A coating layer 13, comprising the binder and a inorganic additive, is disposed on the positive active material layer 12.

The binder improves adherence between the coating layer 13 and the positive active material layer 12, and binds the inorganic materials in the coating layer 13. It also rapidly absorbs emitted exothermic heat, and delays heat diffusion under a serious condition, such as, the physical contact of a positive and a negative electrode during penetration tests. As a result, it improves battery safety.

According to aspects of one embodiment, the binder may be a poly(vinylidenefluoride-hexafluoropropylene) (PVdF-HFP) copolymer comprising 2 to 16 mole % of hexafluoropropylene.

According aspects of to one embodiment, the poly(vinylidenefluoride-hexafluoropropylene) copolymer may comprise 6 to 14 mole % of hexafluoropropylene. When the hexafluoropropylene content is outside of the above range, the cycle-life characteristics of a rechargeable lithium battery at high temperatures may be deteriorated.

The inorganic additive comprised in the coating layer 13, improves the physical strength of the positive electrode. The coating layer inhibits the physical contact between a positive and a negative electrode during penetration tests, and acts as a protective layer. It also improves the conductivity of the positive electrode. That is to say, the lithium ion conductivity of the coating layer can be improved by the inorganic additive, as compared with only using the binder. Accordingly, the coating layer can improve battery safety at overcharge, and battery cycle-life characteristics at high temperatures.

The inorganic additive may be selected from the group consisting of carbon-based materials; oxides including at least one element selected from the group consisting of Al, Si, Sn, Fe, Ba, Zr, Ti, W, V, Mg and combinations thereof; and combinations thereof. According to one embodiment, the inorganic additive is selected from the group consisting of graphite, denka black, ketjen black, acetylene black, carbon nanotubes, carbon nanofiber, carbon nanowire, carbon nanoballs, activated carbon, colloidal silica, amorphous silica, fumed silica, colloidal alumina, amorphous alumina, tin oxide, titanium oxide, vanadium oxide, magnesium oxide, titanium sulfide (TiS$_2$), zirconium oxide (ZrO$_2$), iron oxide, iron sulfide (FeS), iron titanate (FeTiO$_3$), barium titanate (BaTiO$_3$), and combinations thereof.

According to one embodiment, the inorganic additive is a hydrophobic surface-treated silica. The hydrophobic surface-treated silica comprises a silica, and a hydrophobic surface-treatment layer disposed on the surface of the silica. The hydrophobic surface-treatment layer inhibits the accumulation of electrode moisture, and thereby improves high temperature reliability and cycle-life characteristics, at high temperatures.

The hydrophobic surface-treatment may be performed in accordance with well-known methods in this art, a detailed description of which is not provided herein.

The hydrophobic surface-treatment layer comprises at least one surface-treatment compound selected from the group consisting of a substituted or unsubstituted silane-based compound, a substituted or unsubstituted siloxane-based compound, a substituted or unsubstituted silazane-based compound, and combinations thereof. The surface-treatment compound may include at least one substituent selected from the group consisting of a C$_1$ to C$_{12}$ alkyl group, a C$_6$ to C$_{30}$ aryl group, and combinations thereof. Specific examples of the surface treatment compound may include at least one selected from the group consisting of dimethyldichlorosilane (DDS), polydimethylsiloxane (PDMS), hexamethyldisilazane (HMDS), aminosilane (AS), alkylsilane (RS), octamethylcyclotetrasiloxane, and combinations thereof.

For example, the above surface treatment compound may form a hydrophobic surface-treatment layer as shown in the below Reaction Scheme 1.

Reaction Scheme 1

As shown in the reaction scheme, the Si—O—H of the silica is converted to Si—O—SiR$_1$R$_2$R$_3$. The R$_1$, R$_2$, and R$_3$ are independently selected from a C$_1$ to C$_{12}$ alkyl group, a C$_6$ to C$_{30}$ aryl group, and combinations thereof.

The hydrophobic surface-treated silica may comprise a hydrophobic surface-treatment layer on the entire or partial surfaces thereof. The partial hydrophobic surface-treatment layer may be formed on 50%, or more, of the silica.

The hydrophobicly surface-treated silica may have aliphatic CH peaks at 2925-2990 cm$^{-1}$ and 2881-2923 cm$^{-1}$, as determined by infrared absorption spectroscopy.

As the average particle diameter of the inorganic additive decreases, the high temperature cycle-life characteristics of a rechargeable lithium battery can be improved. The inorganic additive has an average particle diameter of less than, or equal to, 2000 nm. According to one embodiment, the inorganic additive has an average particle diameter of 5 to 1000 nm. According to another embodiment, the inorganic additive has an average particle diameter of 12 to 600 nm. According to yet another embodiment, the inorganic additive has an average particle diameter of 40 to 400 nm. When the inorganic additive has an average particle diameter of more than 2000 nm, cycle-life characteristics of the battery may deteriorate.

The inorganic additive is included in an amount of 20 to 4000 parts by weight, based on 100 parts by weight of the binder. According to one embodiment, the inorganic additive is included in an amount of 50 to 3000 parts by weight, based on 100 parts by weight of the binder. According to another embodiment, the inorganic additive is included in an amount of 100 to 2000 parts by weight, based on 100 parts by weight of the binder. According to yet another embodiment, the inorganic additive is included in an amount of 500 to 1500 parts by weight, based on 100 parts by weight of the binder. When the inorganic additive content is less than 20 parts by weight, the effect of the inorganic additive on improving the cycle-life at a high temperature is not realized, whereas when it is more than 4000 parts by weight, the dispersion properties may deteriorate.

The above positive electrode 10 may be fabricated as follows: a positive active material composition, wherein a positive active material, a binder, and optionally a conductive material are mixed in a solvent, is coated on a current collector 11, dried, and compressed to form a positive active material layer 12; and a coating composition, comprising a binder and a inorganic additive mixed in a solvent, is coated on the positive active material layer 12, and dried to form a coating layer 13.

In more detail, first, a positive active material, a binder, and optionally a conductive material are mixed in a solvent to prepare the positive active material composition.

In some embodiments, N-methylpyrrolidone is used as the solvent for the positive active material, binder, and conductive material, but the present disclosure is not limited thereto.

The prepared positive active material composition is coated on a current collector 11, dried, and compressed to fabricate a positive active material layer 12.

The current collector 11 is the same as above-described.

The positive active material composition may be coated using screen printing, spray coating, doctor blade coating, gravure coating, dip coating, silk screen, painting, and slot die coating, and the like.

The compressing pressure, compressing frequency number, and the compressing temperature are not specifically limited.

The active mass density of an electrode indicates a value obtained by dividing the mass of the components (active material, conductive agent, and binder), excluding a current collector in the electrode, by the volume. The unit of the active mass density is g/cc. Generally, the higher the active mass density of an electrode, the better the battery capacity. However, there is problem in that the cycle-life characteristics can deteriorate as the active mass density increases. According to aspects of the present invention, the compressing pressure, compressing frequency number, and the compressing temperature may be adjusted, such that the fabricated positive electrode may have an active mass density of 3.5 g/cc or more, and more specifically, from 3.5 to 4.3 g/cc.

Subsequently, the coating composition is prepared by mixing a binder and a inorganic additive, in a solvent. The binder and inorganic additive are the same as above. N-methylpyrrolidone can be used for the solvent, but the solvent is not limited thereto.

The positive active material layer 12 is coated with the prepared coating composition to fabricate a coating layer 13. Thereby, a positive electrode 10 of a rechargeable lithium battery 10 is fabricated. The coating composition may be coated using the same method as for the positive active material composition.

The positive electrode 10 comprises a coating layer 13, comprising the binder and the inorganic additive disposed on the positive active material layer 12, and thereby direct contact between the electrolyte and the positive electrode can be inhibited, and side-reactions there between can be suppressed, during battery fabrication. Accordingly, high temperature reliability can be produced, and safety problems, due to the side-reactions between the positive electrode and electrolyte, can be prevented.

According to another embodiment, a rechargeable lithium battery comprising the positive electrode 10 is provided.

Figure 2:
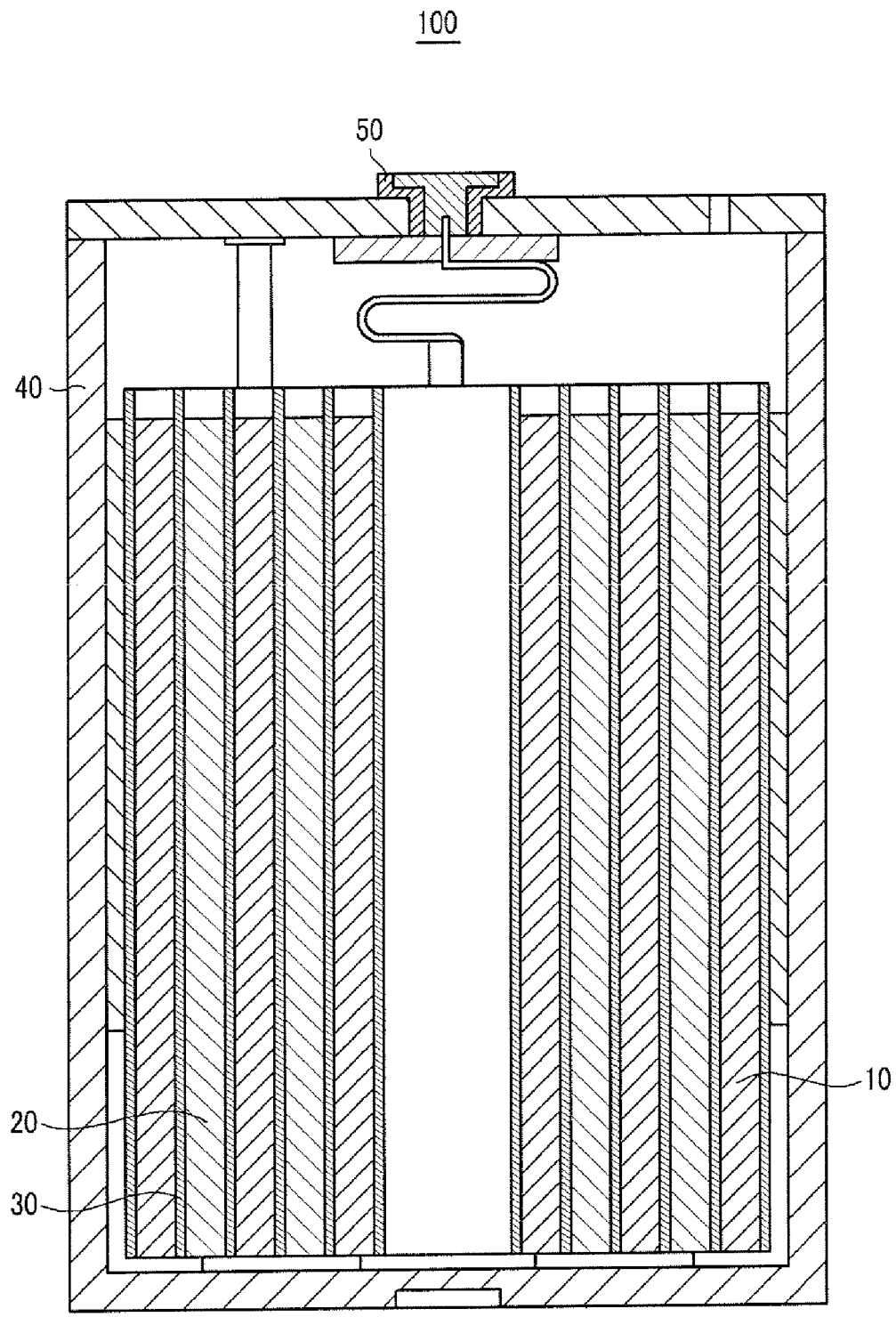
FIG. 2 is a schematic cross-sectional view of a rechargeable lithium battery according to one embodiment of the present invention.

FIG. 2 is a schematic cross-sectional view of a rechargeable lithium battery according to one embodiment of the present invention.

Referring to FIG. 2, a rechargeable lithium battery 100 is mainly constructed of a positive electrode 10, a negative electrode 20, a separator 30 interposed between the positive electrode 10 and the negative electrode 20, an electrolyte in which the separator 30 is immersed, a cell case 40, and a sealing member 50 to seal the cell case 40. The positive electrode 10 is the same as described above.

The negative electrode 20 comprises a current collector and a negative active material layer disposed on the current collector. The negative active material layer comprises electrochemical redox materials, such as, a negative active material than can intercalate and de-intercalate with lithium ions.

The negative active material may comprise at least one selected from the group consisting of lithium, a metal being capable of alloying with lithium, a carbonaceous material, a composite material including the metal and the carbonaceous material, and combinations thereof. The metal being capable of alloying with lithium may comprise Al, Si, Sn, Pb, Zn, Bi, In, Mg, Ga, Cd, Ag, Ge, or Ti. For the negative active material, lithium metal can also be used. The carbonaceous material may comprise an artificial graphite, a natural graphite, a graphitized carbon fiber, a graphitized mesocarbon microbeads, a fullerene, an amorphous carbon, and the like. The amorphous carbon may be a soft carbon (carbon obtained by firing at a low temperature) or a hard carbon (carbon obtained by firing at a high temperature). The crystalline carbon may be a sheet-shaped, a spherical-shaped, or a fiber-shaped, natural graphite or artificial graphite.

The carbonaceous material has an Lc (crystallite size) of at least 20 nm as determined by X-ray diffraction. According to one embodiment, the carbonaceous material has an Lc of 50 to 1000 nm, as determined by X-ray diffraction.

According to aspects of one embodiment, the crystalline carbonaceous material may be more suitable than the amorphous carbonaceous material. The carbonaceous material exhibits an exothermic peak at 700° C., or more.

The carbonaceous material may be a carbon prepared by carbonizing mesophase spherical particles, and performing a graphitizing step on the carbonized material, or graphite fibers prepared by carbonizing and graphitizing. Further, the carbonaceous material may be a graphite fiber prepared by carbonizing a mesophase pitch fiber, and graphitizing the carbonized material.

The active material layer of the negative electrode 20 may further comprise a binder for improving adherence between the negative active material layer and a current collector, or a conductive material. The binder and conductive material are the same as described above.

The negative electrode 20 can be fabricated as follows: a negative active material composition is prepared by mixing a negative active material, a binder, and optionally a conductive material, and then the composition is applied to a negative current collector such as copper. The negative electrode manufacturing method is well known, and thus, is not described in detail in the present specification.

N-methylpyrrolidone can be used for the solvent, but it is not limited thereto.

The current collector may be selected from the group consisting of copper foil, nickel foil, stainless steel foil, titanium foil, nickel foam, copper foam, a polymer substrate coated with a conductive metal, and combinations thereof. According to one embodiment, the copper foil may be appropriate for use as a current collector.

In the rechargeable battery according to one embodiment of the present invention, the electrolyte includes a non-aqueous organic solvent and a lithium salt. The lithium salts act as a lithium-ion source, helping basic battery operation.

According to one embodiment of the present invention, the lithium salt includes at least one selected from the group consisting of $LiPF_6$, $LiBF_4$, $LiSbF_6$, $LiAsF_6$, $LiClO_4$, $LiCF_3SO_3$, $LiC_4F_9SO_3$, $LiN(CF_3SO_2)_2$, $LiN(C_2F_5SO_2)_2$, $LiAlO_2$, $LiAlCl_4$, $LiN(C_pF_{2p+1}SO_2)(C_qF_{2q+1}SO_2)$ wherein p and q are natural numbers, LiCl, LiI, $LiB(C_2O_4)_2$, and combinations thereof.

The lithium salt may be used at a 0.6 to 2.0M concentration. According to one embodiment, the lithium salt may be used at a 0.7 to 1.6M concentration. When the lithium salt concentration is less than 0.6M, electrolyte performance may be degraded, due to low electrolyte conductivity, whereas when it is more than 2.0M, lithium ion mobility may be reduced, due to an increase of electrolyte viscosity.

The non-aqueous organic solvent acts as a medium for transmitting ions taking part in the electrochemical reaction of the battery. The non-aqueous organic solvent may comprise a carbonate-based, an ester-based, an ether-based, a ketone-based, an alcohol-based, or an aprotic, solvent. Examples of the carbonate-based solvent may comprise dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC) and the like. Examples of the ester-based solvent may comprise methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent comprise dibutyl ether, tetraglyme, diglyme, dimethoxyethane, 2-methyltetrahydrofuran, tetrahydrofuran, and the like, and examples of the ketone-based solvent comprise cyclohexanone and the like. Examples of the alcohol-based solvent comprise ethanol, isopropyl alcohol, and the like. Examples of the aprotic solvent comprise a nitrile such as R—CN (wherein R is a C2 to C20 linear, branched, or cyclic hydrocarbon, a double bond, an aromatic ring, or an ether bond), an amide such as dimethylformamide, and a dioxolane such as 1,3-dioxolane, sulfolane, and the like.

The non-aqueous organic solvent may be used singularly or as a mixture. When the organic solvent is used as a mixture, the mixture ratio can be controlled in accordance with a desirable battery performance.

The carbonate-based solvent may comprise a mixture of a cyclic carbonate and a linear carbonate. The cyclic carbonate and the linear carbonate are mixed together in a volume ratio of 1:1 to 1:9, and when this mixture is used as an electrolyte, the electrolyte performance may be enhanced.

In addition, the electrolyte according to one embodiment of the present invention may further comprise mixtures of carbonate-based solvents and aromatic hydrocarbon-based solvents. The carbonate-based solvents and the aromatic hydrocarbon-based solvents are preferably mixed together in a volume ratio of 1:1 to 30:1.

The aromatic hydrocarbon-based organic solvent may be represented by the following Formula 25:

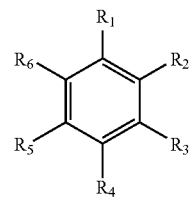

Formula 25 wherein $R_1$ to $R_6$ are independently selected from the group consisting of hydrogen, a halogen, a C1 to $C_{10}$ alkyl, a haloalkyl, and combinations thereof.

The aromatic hydrocarbon-based organic solvent may comprise, but is not limited to, at least one selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The electrolyte may further comprise an additive to improve cell characteristics. Specific examples of the additive comprise an ethylene carbonate-based compound represented by the following Formula 26 to improve thermal stability of a rechargeable lithium battery:

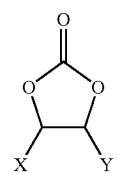

Formula 26 wherein, in the above Formula 26, X and Y are independently selected from the group consisting of a hydrogen, a halogen, a cyano (CN), a nitro ($NO_2$), and a fluorinated C1 to C5 alkyl, provided that at least one of X and Y is selected from the group consisting of a halogen, a cyano (CN), a nitro ($NO_2$), and a fluorinated C1 to C5 alkyl.

According to one embodiment, the ethylene carbonate-based compound may be selected from the group consisting of fluoroethylene carbonate, difluoroethylene carbonate, chloroethylene carbonate, dichloroethylene carbonate, bromoethylene carbonate, dibromoethylene carbonate, nitroethylene carbonate, cyanoethylene carbonate, and combinations thereof. According to another embodiment, fluoroethylene carbonate may be an appropriate ethylene carbonate-based compound.

The ethylene carbonate-based additive is not limited by a specific amount, and may be added in an appropriate amount to obtain thermal stability.

The rechargeable lithium battery generally comprises a separator 30 between the positive electrode 10 and the negative electrode 20. The separator 30 may comprise a polyethylene, a polypropylene, a polyvinylidene fluoride, and multilayers thereof. For example, a polyethylene/polypropylene bilayered separator, a polyethylene/polypropylene/polyethylene three-layered separator, and a polypropylene/polyethylene/polypropylene three-layered separator.

The rechargeable lithium battery 100 having the structure may be fabricated as follows: an electrode assembly including: a positive electrode 10; a negative electrode 20; a separator 30 interposed between the positive electrode 10 and the negative electrode 20; is placed in a battery case 40. An electrolyte is provided through the opening of the battery case 40 and the case is sealed with a sealing member 50.

The following examples illustrate the present invention in more detail. These examples, however, should not in any sense be interpreted as limiting the scope of the present invention.

COMPARATIVE EXAMPLE 1

$LiCoO_2$ as a positive active material, polyvinylidene fluoride (PVDF) as a binder, and Super-P as a conductive material, were mixed in a weight ratio of 94:3:3 in an N-methylpyrrolidone solvent, to prepare a positive active material slurry. The positive active material slurry was coated on a 20 µm-thick aluminum current collector, dried, and compressed, to fabricate a positive electrode.

Carbon, as a negative active material, and PVDF, as a binder, were mixed in a weight ratio of 94:6, in a N-methylpyrrolidone solvent, to prepare a negative active material slurry. The slurry was coated on a 15 µm-thick copper current collector, dried, and compressed, to fabricate a negative electrode.

A 25 µm-thick polyethylene separator was interposed between the fabricated positive and negative electrodes, then spirally wound, and then compressed. Then, an electrolyte solution was injected to fabricate a 18650 cylindrical battery cell. 1.3M $LiPF_6$, dissolved in a mixed non-aqueous organic solvent of ethylene carbonate/dimethyl carbonate/ethylmethyl carbonate (EC/DMC/EMC) in a volume ratio of 3:3:4, was used as the electrolyte solution.

EXAMPLE 1

$LiCoO_2$, as a positive active material, polyvinylidene fluoride (PVDF), as a binder, and Super-P, as a conductive material, were mixed in a weight ratio of 94:3:3 in an N-methylpyrrolidone solvent, to prepare a positive active material slurry. The positive active material slurry was coated on a 20 µm-thick aluminum current collector, dried, and compressed to fabricate a positive electrode.

100 parts by weight of PVDF, including 10 mole % HFP, was dispersed in acetone, and then 500 parts by weight of fumed silica, having an average particle diameter of 100 nm, and surface-treated with hydrophobic HMDS (hexamethyldisilazane), was added to prepare a coating composition. The coating composition was coated on the surface of the positive active material layer, and dried, to fabricate a positive electrode.

Carbon, as a negative active material, and PVDF, as a binder, were mixed in a weight ratio of 94:6 in an N-methylpyrrolidone solvent, to prepare a negative active material slurry. The slurry was coated on a 15 µm-thick copper current collector, dried, and compressed to fabricate a negative electrode.

A 25 µm-thick polyethylene separator was interposed between the fabricated positive and negative electrodes, spirally wound, and compressed. Then, an electrolyte solution was injected, to fabricate a 18650 cylindrical battery cell. 1.3M $LiPF_6$, dissolved in a mixed non-aqueous organic solvent of ethylene carbonate/dimethyl carbonate/ethylmethyl carbonate (EC/DMC/EMC), in a volume ratio of 3:3:4, was used as an electrolyte solution.

EXAMPLE 2

The rechargeable lithium battery cells were fabricated according to the method of Example 1, except that the untreated fumed silica was used, instead of the hydrophobic surface-treated silica, as an inorganic additive.

EXAMPLE 3

The rechargeable lithium battery cells were fabricated according to the method of Example 1, except that $Al_2O_3$ was used, instead of the hydrophobic surface-treated silica, as an inorganic additive.

EXAMPLE 4

The rechargeable lithium battery cells were fabricated according to the method of Example 1, except that $TiO_2$ was used, instead of the hydrophobic surface-treated silica, as an inorganic additive.

EXAMPLE 5

The rechargeable lithium battery cells were fabricated according to the method of Example 1, except that MgO was used, instead of the hydrophobic surface-treated silica, as an inorganic additive.

EXAMPLE 6

The rechargeable lithium battery cells were fabricated according to the method of Example 1, except that $ZrO_2$ was used, instead of the hydrophobic surface-treated silica, as an inorganic additive.

Figure 3:
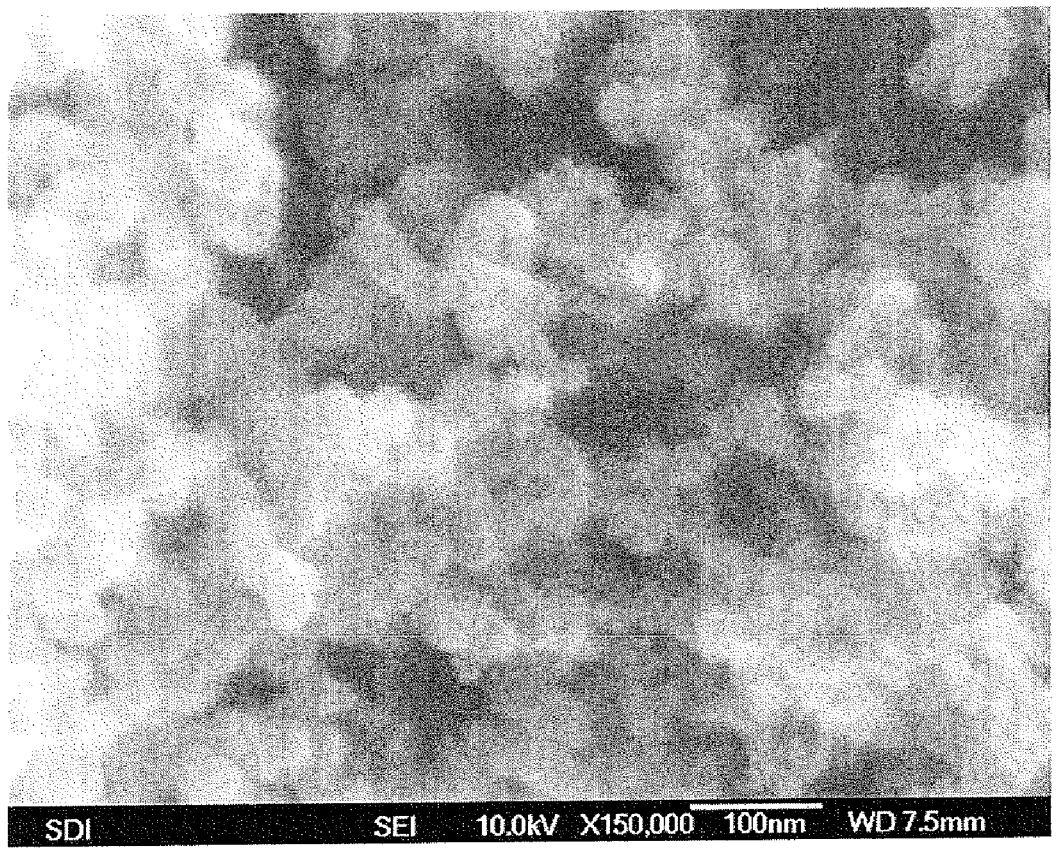
FIG. 3 is a scanning electron microscope micrograph of fumed silica before surface-treatment in Example 1.

A scanning electron microscope (SEM) micrograph, of the fumed silica before surface-treatment in Example 1, is shown in FIG. 3.

As shown in FIG. 3, the fumed silica includes secondary particles, having an average particle diameter of 100 nm, that are formed by the agglomeration of primary particles having an average particle diameter of 20 nm.

Figure 4:
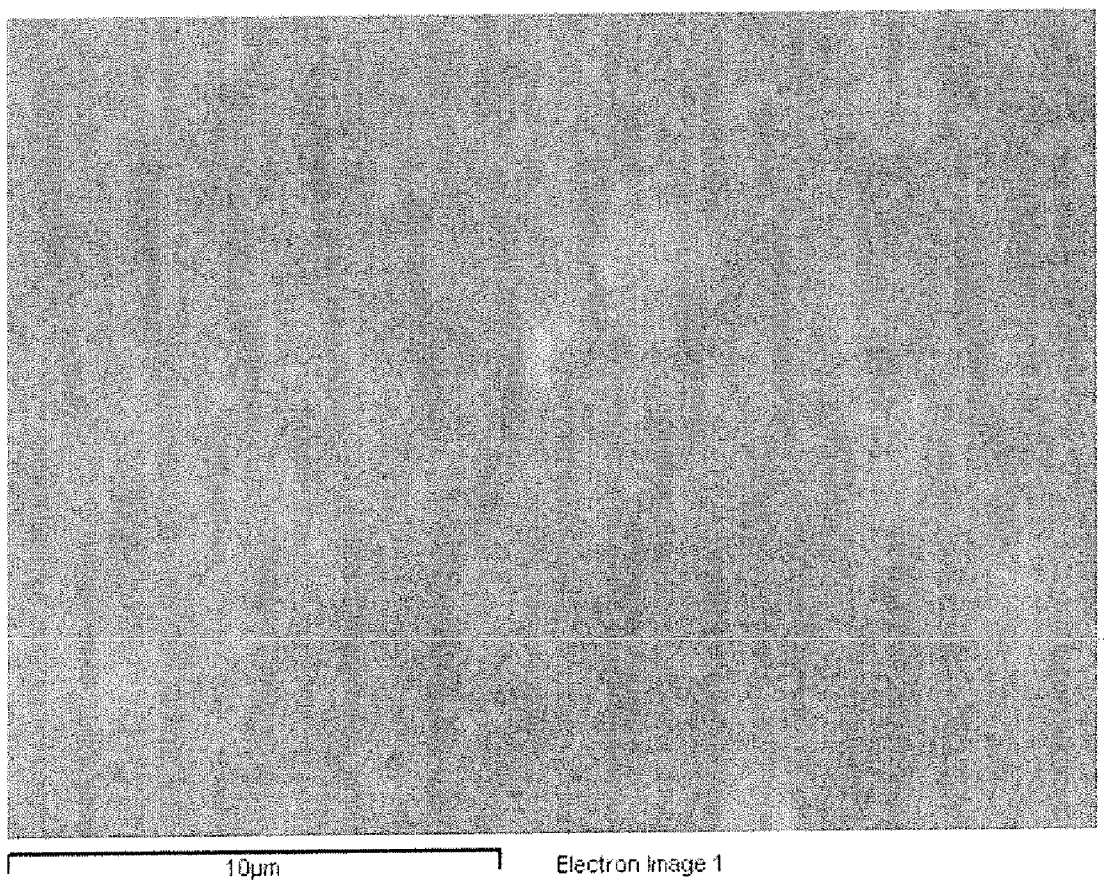
FIG. 4 is a scanning electron microscope micrograph of the coating layer in the rechargeable lithium battery, according to Example 1.

The scanning electron microscope (SEM) micrograph, of the coating layer formed on the positive active material layer in the rechargeable lithium battery according to Example 1, is shown in FIG. 4. An energy dispersive X-ray (EDX) spectroscopy result of the coating layer, in the rechargeable lithium battery according to Example 1, is shown in FIG. 5.

Figure 5:
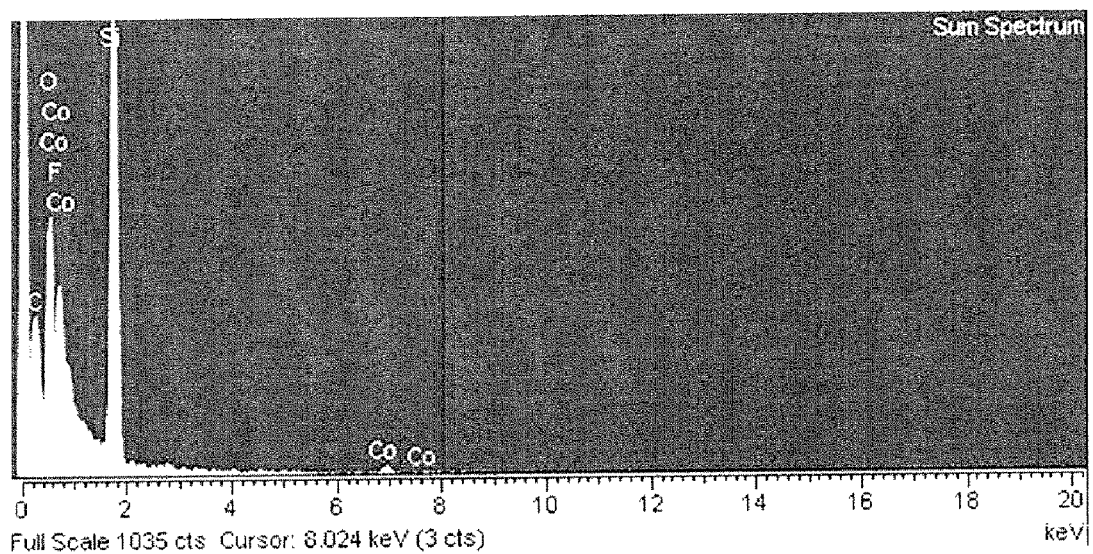
FIG. 5 is an energy dispersive X-ray spectroscopy result of the coating layer in the rechargeable lithium battery, according to Example 1.

In FIGS. 4 and 5, an Si peak for a silica component and an F peak for a polymer component, are shown as a result of an EDX analysis of the coating layer. These results indicate that a material, including silica and an F component, is present in the coating layer.

Figure 6:
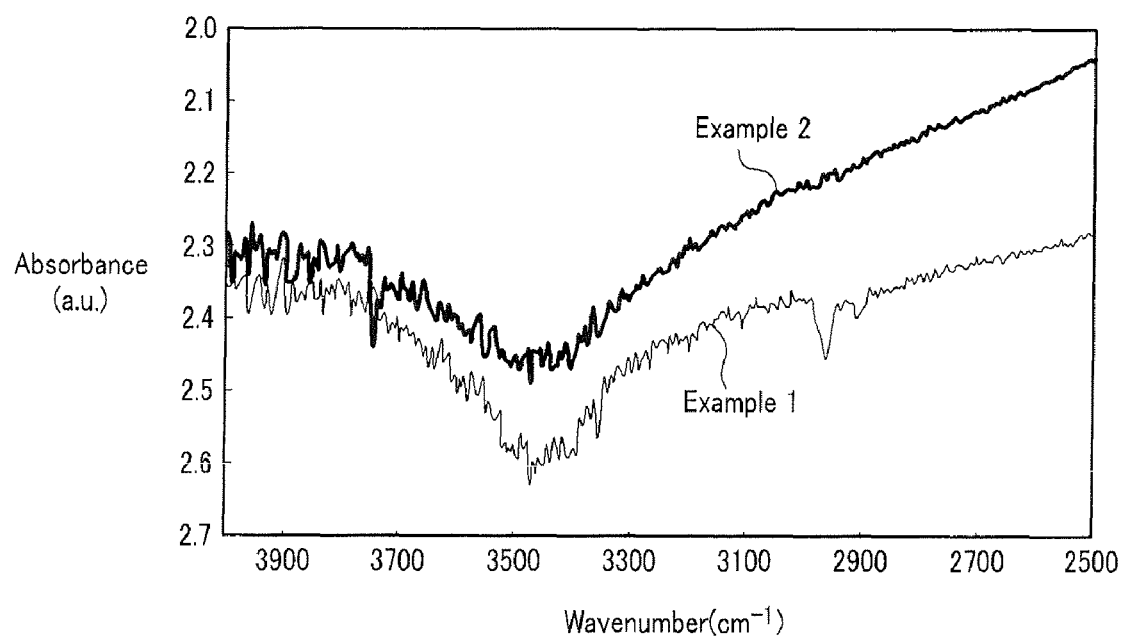
FIG. 6 shows Fourier transform infrared spectrometry (FT-IR) results of the surface-treated fumed silica according to Example 1, and the untreated fumed silica according to Example 2.

Fourier transform infrared spectrometry (FT-IR) results, of the surface-treated fumed silica according to Example 1, and the untreated fumed silica according to Example 2, are shown in FIG. 6.

As shown in FIG. 6, the fumed silica according to Example 2 showed a hydroxyl (OH) peak at 3745 $cm^{-1}$. On the contrary, the surface-treated fumed silica according to Example 1 showed aliphatic CH peaks at 2925-2990 $cm^{-1}$ and 2881-2923 $cm^{-1}$.

1. Battery Cell Performance Depending on a Kind of a Polymer and Amount of an Inorganic Additive In order to evaluate the performance of a battery cell, depending on a kind of a polymer and an amount of an inorganic additive, rechargeable lithium battery cells were fabricated according to the method of Example 1, except that the kinds of polymer, and the amounts of inorganic additive, were varied as shown in Tables 1 and 2. For the inorganic additive in the coating layer, fumed silica having an average particle diameter of 100 nm, that was surface-treated with hexamethyldisilazane (HMDS), was used.

The fabricated rechargeable lithium battery cells were tested for penetration while charging and overcharging, and a 300th cycle-life (number of charge and discharge cycles) characteristics, at 60° C.

The fabricated rechargeable lithium battery cells were charged at 0.2 C and discharged at 0.2 C during a formation process, and then charged at 0.5 C and discharged at 0.2 C during a standard process. Subsequently, the rechargeable lithium battery cells were charged and discharged at 1.0 C, at 60° C., to evaluate the 300th cycle-life characteristics.

The measurement results are shown in the following Tables 1 and 2. In the following Tables 1 and 2, HFP content % refers to a mole %.

TABLE 1

| | Kind of binder | Binder amount (parts by weight) | Inorganic additive (parts by weight) | Penetration test | Penetration test at overcharge | Capacity retention (capacity at $300^{th}$ cycle/ capacity at $1^{st}$ cycle) (%) |
|---|---|---|---|---|---|---|
| Comp. Ex. 1 | — | — | — | Fired | Fired | 22 |
| Comp. Ex. A1 | PVDF | 100 | 0 | Unfired | Fired | 15 |
| Comp. Ex. A2 | PVDF | 100 | 20 | Unfired | Unfired | 17 |
| Comp. Ex. A3 | PVDF | 100 | 50 | Unfired | Unfired | 20 |
| Comp. Ex. A4 | PVDF | 100 | 100 | Unfired | Unfired | 23 |
| Comp. Ex.. A5 | PVDF | 100 | 500 | Unfired | Unfired | 32 |
| Comp. Ex. A6 | PVDF | 100 | 1000 | Unfired | Unfired | 30 |
| Comp. Ex. A7 | PVDF | 100 | 1500 | Unfired | Unfired | 26 |
| Comp. Ex. A8 | PVDF | 100 | 2000 | Unfired | Unfired | 24 |
| Comp. Ex. A9 | PVDF | 100 | 3000 | Unfired | Unfired | 22 |
| Comp. Ex. A10 | PVDF | 100 | 4000 | Unfired | Unfired | 21 |
| Comp. Ex. B1 | PVDF including 2% HFP | 100 | 0 | Unfired | Fired | 17 |
| Ex. B2 | PVDF including 2% HFP | 100 | 20 | Unfired | Unfired | 19 |
| Ex. B3 | PVDF including 2% HFP | 100 | 50 | Unfired | Unfired | 22 |
| Ex. B4 | PVDF including 2% HFP | 100 | 100 | Unfired | Unfired | 25 |
| Ex. B5 | PVDF including 2% HFP | 100 | 500 | Unfired | Unfired | 35 |
| Ex. B6 | PVDF including 2% HFP | 100 | 1000 | Unfired | Unfired | 32 |
| Ex. B7 | PVDF including 2% HFP | 100 | 1500 | Unfired | Unfired | 28 |

TABLE 1-continued

|  | Kind of binder | Binder amount (parts by weight) | Inorganic additive (parts by weight) | Penetration test | Penetration test at overcharge | Capacity retention (capacity at 300$^{th}$ cycle/ capacity at 1$^{st}$ cycle) (%) |
| --- | --- | --- | --- | --- | --- | --- |
| Ex. B8 | PVDF including 2% HFP | 100 | 2000 | Unfired | Unfired | 27 |
| Ex. B9 | PVDF including 2% HFP | 100 | 3000 | Unfired | Unfired | 24 |
| Ex. B10 | PVDF including 2% HFP | 100 | 4000 | Unfired | Unfired | 23 |
| Comp. Ex. C1 | PVDF including 4% HFP | 100 | 0 | Unfired | Fired | 20 |
| Ex. C2 | PVDF including 4% HFP | 100 | 20 | Unfired | Unfired | 21 |
| Ex. C3 | PVDF including 4% HFP | 100 | 50 | Unfired | Unfired | 24 |
| Ex. C4 | PVDF including 4% HFP | 100 | 100 | Unfired | Unfired | 29 |
| Ex. C5 | PVDF including 4% HFP | 100 | 500 | Unfired | Unfired | 37 |
| Ex. C6 | PVDF including 4% HFP | 100 | 1000 | Unfired | Unfired | 34 |
| Ex. C7 | PVDF including 4% HFP | 100 | 1500 | Unfired | Unfired | 29 |
| Ex. C8 | PVDF including 4% HFP | 100 | 2000 | Unfired | Unfired | 30 |
| Ex. C9 | PVDF including 4% HFP | 100 | 3000 | Unfired | Unfired | 26 |
| Ex. C10 | PVDF including 4% HFP | 100 | 4000 | Unfired | Unfired | 25 |
| Comp. Ex. D1 | PVDF including 6% HFP | 100 | 0 | Unfired | Fired | 45 |
| Ex. D2 | PVDF including 6% HEP | 100 | 20 | Unfired | Unfired | 47 |
| Ex. D3 | PVDF including 6% HFP | 100 | 50 | Unfired | Unfired | 50 |
| Ex. D4 | PVDF including 6% HFP | 100 | 100 | Unfired | Unfired | 61 |
| Ex. D5 | PVDF including 6% HFP | 100 | 500 | Unfired | Unfired | 72 |
| Ex. D6 | PVDF including 6% HFP | 100 | 1000 | Unfired | Unfired | 63 |
| Ex. D7 | PVDF including 6% HFP | 100 | 1500 | Unfired | Unfired | 56 |
| Ex. D8 | PVDF including 6% HFP | 100 | 2000 | Unfired | Unfired | 54 |
| Ex. D9 | PVDF including 6% HFP | 100 | 3000 | Unfired | Unfired | 53 |
| Ex. D10 | PVDF including 6% HFP | 100 | 4000 | Unfired | Unfired | 50 |

TABLE 2

| | Kind of binder | Binder amount (parts by weight) | Inorganic additive (parts by weight) | Penetration test | Penetration test at overcharge | Capacity retention (capacity at 300$^{th}$ cycle/capacity at 1$^{st}$ cycle) (%) |
|---|---|---|---|---|---|---|
| Comp. Ex. E1 | PVDF including 8% HFP | 100 | 0 | Unfired | Fired | 46 |
| Ex. E2 | PVDF including 8% HFP | 100 | 20 | Unfired | Unfired | 49 |
| Ex. E3 | PVDF including 8% HFP | 100 | 50 | Unfired | Unfired | 53 |
| Ex. E4 | PVDF including 8% HFP | 100 | 100 | Unfired | Unfired | 62 |
| Ex. E5 | PVDF including 8% HFP | 100 | 500 | Unfired | Unfired | 73 |
| Ex. E6 | PVDF including 8% HFP | 100 | 1000 | Unfired | Unfired | 64 |
| Ex. E7 | PVDF including 8% HFP | 100 | 1500 | Unfired | Unfired | 60 |
| Ex. E8 | PVDF including 8% HFP | 100 | 2000 | Unfired | Unfired | 57 |
| Ex. E9 | PVDF including 8% HFP | 100 | 3000 | Unfired | Unfired | 55 |
| Ex. E10 | PVDF including 8% HFP | 100 | 4000 | Unfired | Unfired | 51 |
| Comp. Ex. F1 | PVDF including 10% HFP | 100 | 0 | Unfired | Fired | 49 |
| Ex. F2 | PVDF including 10% HFP | 100 | 20 | Unfired | Unfired | 53 |
| Ex. F3 | PVDF including 10% HFP | 100 | 50 | Unfired | Unfired | 58 |
| Ex. F4 | PVDF including 10% HFP | 100 | 100 | Unfired | Unfired | 67 |
| Ex. F5 | PVDF including 10% HFP | 100 | 500 | Unfired | Unfired | 78 |
| Ex. F6 | PVDF including 10% HFP | 100 | 1000 | Unfired | Unfired | 70 |
| Ex. F7 | PVDF including 10% HFP | 100 | 1500 | Unfired | Unfired | 64 |
| Ex. F8 | PVDF including 10% HFP | 100 | 2000 | Unfired | Unfired | 62 |
| Ex. F9 | PVDF including 10% HFP | 100 | 3000 | Unfired | Unfired | 60 |
| Ex. F10 | PVDF including 10% HFP | 100 | 4000 | Unfired | Unfired | 55 |
| Comp. Ex. G1 | PVDF including 12% HFP | 100 | 0 | Unfired | Fired | 52 |
| Ex. G2 | PVDF including 12% HFP | 100 | 20 | Unfired | Unfired | 57 |
| Ex. G3 | PVDF including 12% HFP | 100 | 50 | Unfired | Unfired | 63 |

TABLE 2-continued

| | Kind of binder | Binder amount (parts by weight) | Inorganic additive (parts by weight) | Penetration test | Penetration test at overcharge | Capacity retention (capacity at 300$^{th}$ cycle/ capacity at 1$^{st}$ cycle) (%) |
|---|---|---|---|---|---|---|
| Ex. G4 | PVDF including 12% HFP | 100 | 100 | Unfired | Unfired | 71 |
| Ex. G5 | PVDF including 12% HFP | 100 | 500 | Unfired | Unfired | 83 |
| Ex. G6 | PVDF including 12% HFP | 100 | 1000 | Unfired | Unfired | 76 |
| Ex. G7 | PVDF including 12% HFP | 100 | 1500 | Unfired | Unfired | 68 |
| Ex. G8 | PVDF including 12% HFP | 100 | 2000 | Unfired | Unfired | 67 |
| Ex. G9 | PVDF including 12% HFP | 100 | 3000 | Unfired | Unfired | 63 |
| Ex. G10 | PVDF including 12% HFP | 100 | 4000 | Unfired | Unfired | 59 |
| Comp. Ex. H1 | PVDF including 14% HFP | 100 | 0 | Unfired | Fired | 50 |
| Ex. H2 | PVDF including 14% HFP | 100 | 20 | Unfired | Unfired | 53 |
| Ex. H3 | PVDF including 14% HFP | 100 | 50 | Unfired | Unfired | 60 |
| Ex. H4 | PVDF including 14% HFP | 100 | 100 | Unfired | Unfired | 66 |
| Ex. H5 | PVDF including 14% HFP | 100 | 500 | Unfired | Unfired | 79 |
| Ex. H6 | PVDF including 14% HFP | 100 | 1000 | Unfired | Unfired | 73 |
| Ex. H7 | PVDF including 14% HFP | 100 | 1500 | Unfired | Unfired | 65 |
| Ex. H8 | PVDF including 14% HFP | 100 | 2000 | Unfired | Unfired | 62 |
| Ex. H9 | PVDF including 14% HFP | 100 | 3000 | Unfired | Unfired | 60 |
| Ex. H10 | PVDF including 14% HFP | 100 | 4000 | Unfired | Unfired | 56 |
| Comp. Ex. I1 | PVDF including 16% HFP | 100 | 0 | Unfired | Fired | 28 |
| Ex. I2 | PVDF including 16% HFP | 100 | 20 | Unfired | Unfired | 31 |
| Ex. I3 | PVDF including 16% HFP | 100 | 50 | Unfired | Unfired | 38 |
| Ex. I4 | PVDF including 16% HFP | 100 | 100 | Unfired | Unfired | 44 |
| Ex. I5 | PVDF including 16% HFP | 100 | 500 | Unfired | Unfired | 57 |
| Ex. I6 | PVDF including 16% HFP | 100 | 1000 | Unfired | Unfired | 51 |

TABLE 2-continued

| | Kind of binder | Binder amount (parts by weight) | Inorganic additive (parts by weight) | Penetration test | Penetration test at overcharge | Capacity retention (capacity at 300$^{th}$ cycle/capacity at 1$^{st}$ cycle) (%) |
|---|---|---|---|---|---|---|
| Ex. I7 | PVDF including 16% HFP | 100 | 1500 | Unfired | Unfired | 43 |
| Ex. I8 | PVDF including 16% HFP | 100 | 2000 | Unfired | Unfired | 40 |
| Ex. I9 | PVDF including 16% HFP | 100 | 3000 | Unfired | Unfired | 38 |
| Ex. I10 | PVDF including 16% HFP | 100 | 4000 | Unfired | Unfired | 34 |

As shown in Tables 1 and 2, the rechargeable lithium battery cell, that did not comprise a coating layer according to Comparative Example 1, burned during charging and overcharging at the penetration test. The rechargeable lithium battery cells, including coating layers without inorganic additives according to Comparative Examples A1, B1, C1, D1, E1, F1, G1, H1, and I1, were burned at the penetration test during overcharging. However, they were not burned at the penetration test during charging, due to the presence of a polymer.

On the contrary, the rechargeable lithium battery cells including coating layers and inorganic additives, according to all examples, were not burned at the penetration tests during overcharging and charging, indicating that they all had excellent safety properties.

A measurement of the capacity retention at the 300$^{th}$ cycle, at 60° C., of the battery cells according to the comparative examples, showed 22%, while those according to the examples showed up to 80%. The cycle-life characteristics of the examples varied according to the kind of binder. Particularly, when the content of HFP was excessive, cycle-life characteristics at a high temperature decreased. These results show that 6 to 14 mole % of HFP in the binder can improve cycle-life characteristics at a high temperature.

50 to 2000 parts by weight of the inorganic additive, based on 100 parts by weight of the binder, can also improve cycle-life characteristics at a high temperature.

2. Battery Cell Performance Evaluation Depending on an Average Particle Diameter of the Inorganic Additive In order to evaluate a battery cell performance depending on the average particle diameter of the inorganic additive, rechargeable lithium battery cells were fabricated according to the method of Example 1, except that the average particle diameters of the inorganic additive were varied as shown in Tables 3 and 4. For the inorganic additive, 500 parts by weight of fumed silica, that was surface-treated with hexamethyldisilazane (HMDS) based on 100 parts by weight of the binder, was used.

The fabricated rechargeable lithium battery cells were tested in accordance with the same manner as in the above battery cell performance tests, depending on the kind of polymer and the amount of inorganic additive. The measurement results are shown in the following Tables 3 and 4. In the following Tables 3 and 4, HFP content % refers to mole %.

TABLE 3

| | Kind of binder | Average particle diameter of Inorganic additive (nm) | Penetration test | Penetration test at overcharge | Capacity retention (capacity at 300$^{th}$ cycle/capacity at 1$^{st}$ cycle) (%) |
|---|---|---|---|---|---|
| Comp. Ex. 1 | — | — | Fired | Fired | 22 |
| Comp. Ex. A2-1 | PVDF | 5 | Unfired | Unfired | 39 |
| Comp. Ex. A3-1 | PVDF | 12 | Unfired | Unfired | 36 |
| Comp. Ex. A4-1 | PVDF | 40 | Unfired | Unfired | 34 |
| Comp. Ex. A5 | PVDF | 100 | Unfired | Unfired | 32 |
| Comp. Ex. A6-1 | PVDF | 200 | Unfired | Unfired | 31 |
| Comp. Ex. A7-1 | PVDF | 400 | Unfired | Unfired | 30 |
| Comp. Ex. A8-1 | PVDF | 600 | Unfired | Unfired | 28 |

TABLE 3-continued

| | Kind of binder | Average particle diameter of Inorganic additive (nm) | Penetration test | Penetration test at overcharge | Capacity retention (capacity at 300$^{th}$ cycle/ capacity at 1$^{st}$ cycle) (%) |
|---|---|---|---|---|---|
| Comp. Ex. A9-1 | PVDF | 1000 | Unfired | Unfired | 27 |
| Comp. Ex. A10-1 | PVDF | 2000 | Unfired | Unfired | 21 |
| Ex. B2-1 | PVDF including 2% HFP | 5 | Unfired | Unfired | 43 |
| Ex. B3-1 | PVDF including 2% HFP | 12 | Unfired | Unfired | 39 |
| Ex. B4-1 | PVDF including 2% HFP | 40 | Unfired | Unfired | 37 |
| Ex. B5 | PVDF including 2% HFP | 100 | Unfired | Unfired | 35 |
| Ex. B6-1 | PVDF including 2% HFP | 200 | Unfired | Unfired | 34 |
| Ex. B7-1 | PVDF including 2% HFP | 400 | Unfired | Unfired | 33 |
| Ex. B8-1 | PVDF including 2% HFP | 600 | Unfired | Unfired | 31 |
| Ex. B9-1 | PVDF including 2% HFP | 1000 | Unfired | Unfired | 30 |
| Ex. B10-1 | PVDF including 2% HFP | 2000 | Unfired | Unfired | 24 |
| Ex. C2-1 | PVDF including 4% HFP | 5 | Unfired | Unfired | 44 |
| Ex. C3-1 | PVDF including 4% HFP | 12 | Unfired | Unfired | 41 |
| Ex. C4-1 | PVDF including 4% HFP | 40 | Unfired | Unfired | 39 |
| Ex. C5 | PVDF including 4% HFP | 100 | Unfired | Unfired | 37 |
| Ex. C6-1 | PVDF including 4% HFP | 200 | Unfired | Unfired | 36 |
| Ex. C7-1 | PVDF including 4% HFP | 400 | Unfired | Unfired | 35 |
| Ex. C8-1 | PVDF including 4% HFP | 600 | Unfired | Unfired | 34 |
| Ex. C9-1 | PVDF including 4% HFP | 1000 | Unfired | Unfired | 32 |
| Ex. C10-1 | PVDF including 4% HFP | 2000 | Unfired | Unfired | 26 |
| Ex. D2-1 | PVDF including 6% HFP | 5 | Unfired | Unfired | 53 |
| Ex. D3-1 | PVDF including 6% HFP | 12 | Unfired | Unfired | 49 |
| Ex. D4-1 | PVDF including 6% HFP | 40 | Unfired | Unfired | 47 |
| Ex. D5 | PVDF including 6% HFP | 100 | Unfired | Unfired | 45 |

TABLE 3-continued

| | Kind of binder | Average particle diameter of Inorganic additive (nm) | Penetration test | Penetration test at overcharge | Capacity retention (capacity at 300$^{th}$ cycle/ capacity at 1$^{st}$ cycle) (%) |
|---|---|---|---|---|---|
| Ex. D6-1 | PVDF including 6% HFP | 200 | Unfired | Unfired | 44 |
| Ex. D7-1 | PVDF including 6% HFP | 400 | Unfired | Unfired | 43 |
| Ex. D8-1 | PVDF including 6% HFP | 600 | Unfired | Unfired | 41 |
| Ex. D9-1 | PVDF including 6% HFP | 1000 | Unfired | Unfired | 40 |
| Ex. D10-1 | PVDF including 6% HFP | 2000 | Unfired | Unfired | 30 |

TABLE 4

| | Kind of binder | Average particle diameter of Inorganic additive (nm) | Penetration test | Penetration test at overcharge | Capacity retention (capacity at 300$^{th}$ cycle/ capacity at 1$^{st}$ cycle) (%) |
|---|---|---|---|---|---|
| Comp. Ex. 1 | — | — | Fired | Fired | 22 |
| Ex. E2-1 | PVDF including 8% HFP | 5 | Unfired | Unfired | 80 |
| Ex. E3-1 | PVDF including 8% HFP | 12 | Unfired | Unfired | 77 |
| Ex. E4-1 | PVDF including 8% HFP | 40 | Unfired | Unfired | 75 |
| Ex. E5 | PVDF including 8% HFP | 100 | Unfired | Unfired | 73 |
| Ex. E6-1 | PVDF including 8% HFP | 200 | Unfired | Unfired | 72 |
| Ex. E7-1 | PVDF including 8% HFP | 400 | Unfired | Unfired | 71 |
| Ex. E8-1 | PVDF including 8% HFP | 600 | Unfired | Unfired | 70 |
| Ex. E9-1 | PVDF including 8% HFP | 1000 | Unfired | Unfired | 67 |
| Ex. E10-1 | PVDF including 8% HFP | 2000 | Unfired | Unfired | 60 |
| Ex. F2-1 | PVDF including 10% HFP | 5 | Unfired | Unfired | 86 |
| Ex. F3-1 | PVDF including 10% HFP | 12 | Unfired | Unfired | 82 |
| Ex. F4-1 | PVDF including 10% HFP | 40 | Unfired | Unfired | 80 |
| Ex. F5 | PVDF including 10% HFP | 100 | Unfired | Unfired | 78 |
| Ex. F6-1 | PVDF including 10% HFP | 200 | Unfired | Unfired | 77 |

TABLE 4-continued

| | Kind of binder | Average particle diameter of Inorganic additive (nm) | Penetration test | Penetration test at overcharge | Capacity retention (capacity at 300$^{th}$ cycle/ capacity at 1$^{st}$ cycle) (%) |
|---|---|---|---|---|---|
| Ex. F7-1 | PVDF including 10% HFP | 400 | Unfired | Unfired | 76 |
| Ex. F8-1 | PVDF including 10% HFP | 600 | Unfired | Unfired | 75 |
| Ex. F9-1 | PVDF including 10% HFP | 1000 | Unfired | Unfired | 72 |
| Ex. F10-1 | PVDF including 10% HFP | 2000 | Unfired | Unfired | 67 |
| Ex. G2-1 | PVDF including 12% HFP | 5 | Unfired | Unfired | 90 |
| Ex. G3-1 | PVDF including 12% HFP | 12 | Unfired | Unfired | 87 |
| Ex. G4-1 | PVDF including 12% HFP | 40 | Unfired | Unfired | 85 |
| Ex. G5 | PVDF including 12% HFP | 100 | Unfired | Unfired | 83 |
| Ex. G6-1 | PVDF including 12% HFP | 200 | Unfired | Unfired | 82 |
| Ex. G7-1 | PVDF including 12% HFP | 400 | Unfired | Unfired | 81 |
| Ex. G8-1 | PVDF including 12% HFP | 600 | Unfired | Unfired | 80 |
| Ex. G9-1 | PVDF including 12% HFP | 1000 | Unfired | Unfired | 78 |
| Ex. G10-1 | PVDF including 12% HFP | 2000 | Unfired | Unfired | 73 |
| Ex. H2-1 | PVDF including 14% HFP | 5 | Unfired | Unfired | 86 |
| Ex. H3-1 | PVDF including 14% HFP | 12 | Unfired | Unfired | 83 |
| Ex. H4-1 | PVDF including 14% HFP | 40 | Unfired | Unfired | 81 |
| Ex. H5 | PVDF including 14% HFP | 100 | Unfired | Unfired | 79 |
| Ex. H6-1 | PVDF including 14% HFP | 200 | Unfired | Unfired | 78 |
| Ex. H7-1 | PVDF including 14% HFP | 400 | Unfired | Unfired | 77 |
| Ex. H8-1 | PVDF including 14% HFP | 600 | Unfired | Unfired | 76 |
| Ex. H9-1 | PVDF including 14% HFP | 1000 | Unfired | Unfired | 74 |
| Ex. H10-1 | PVDF including 14% HFP | 2000 | Unfired | Unfired | 66 |
| Ex. I2-1 | PVDF including 16% HFP | 5 | Unfired | Unfired | 65 |
| Ex. I3-1 | PVDF including 16% HFP | 12 | Unfired | Unfired | 63 |

TABLE 4-continued

| | Kind of binder | Average particle diameter of Inorganic additive (nm) | Penetration test | Penetration test at overcharge | Capacity retention (capacity at 300$^{th}$ cycle/capacity at 1$^{st}$ cycle) (%) |
|---|---|---|---|---|---|
| Ex. I4-1 | PVDF including 16% HFP | 40 | Unfired | Unfired | 59 |
| Ex. I5 | PVDF including 16% HFP | 100 | Unfired | Unfired | 57 |
| Ex. I6-1 | PVDF including 16% HFP | 200 | Unfired | Unfired | 56 |
| Ex. I7-1 | PVDF including 16% HFP | 400 | Unfired | Unfired | 55 |
| Ex. I8-1 | PVDF including 16% HFP | 600 | Unfired | Unfired | 54 |
| Ex. I9-1 | PVDF including 16% HFP | 1000 | Unfired | Unfired | 50 |
| Ex. I10-1 | PVDF including 16% HFP | 2000 | Unfired | Unfired | 44 |

As shown in Tables 3 and 4, the rechargeable lithium battery cell, that did not comprise a coating layer according to Comparative Example 1, was burned during the charging and overcharging, at the penetration tests. On the contrary, the rechargeable lithium battery cells, including a coating layer that included both a binder and an inorganic additive according to the examples, were not burned. These results indicate that the average particle diameter of the inorganic additive in the coating layer does not have an effect on the safety of the rechargeable lithium battery cells.

Example A10-1 showed a 1% decrease in cycle-life characteristics, as compared to Comparative Example 1, but showed excellent safety during the penetration tests, at charging and overcharging.

However, the cycle-life characteristics at a high temperature were varied depending on the average particle diameter of the inorganic additive. That is to say, cycle-life characteristics, during charging and high temperature overcharging of the rechargeable lithium battery cells, were varied. As the particle diameter of the inorganic additive decreased, cycle-life characteristics at a high temperature increased. When the average particle diameter is less than, or equal to, 1000 nm, excellent cycle-life characteristics were realized.

3. Battery Cell Performance Evaluation Depending on a Kind of Inorganic Additive In order to evaluate the battery cell performance, depending on the kind of inorganic additive, rechargeable lithium battery cells were fabricated according to the method of Example 1, except that the kinds of inorganic additives were varied, as shown in the following Table 5.

The fabricated rechargeable lithium battery cells were tested in the same manner as in the above battery cell performance tests, depending on a kind of a polymer and an amount of an inorganic additive. The measurement results are shown in Table 5. In Table 5, HFP content % refers to mole %.

TABLE 5

| | Binder | | Inorganic additive | | | Penetration test | Penetration test at overcharge | Capacity retention (capacity at 300$^{th}$ cycle/capacity at 1$^{st}$ cycle) (%) |
|---|---|---|---|---|---|---|---|---|
| | Kind | Amount (parts by weight) | Kind | Average particle diameter (nm) | Amount (parts by weight) | | | |
| Comp. Ex. 1 | — | — | — | — | — | Fired | Fired | 22 |
| Ex. 1 | PVDF including 10% HFP | 100 | SiO$_2$ | 100 | 500 | Unfired | Unfired | 78 |

TABLE 5-continued

| | Binder | | Inorganic additive | | | | Capacity retention (capacity at 300$^{th}$ cycle/capacity at 1$^{st}$ cycle) (%) |
|---|---|---|---|---|---|---|---|
| | Kind | Amount (parts by weight) | Kind | Average particle diameter (nm) | Amount (parts by weight) | Penetration test | Penetration test at overcharge | |
| Ex. 2 | PVDF including 10% HFP | 100 | SiO$_2$ | 100 | 500 | Unfired | Unfired | 40 |
| Ex. 3 | PVDF including 10% HFP | 100 | Al$_2$O$_3$ | 100 | 500 | Unfired | Unfired | 75 |
| Ex. 4 | PVDF including 10% HFP | 100 | TiO$_2$ | 100 | 500 | Unfired | Unfired | 77 |
| Ex. 5 | PVDF including 10% HFP | 100 | MgO | 100 | 500 | Unfired | Unfired | 74 |
| Ex. 6 | PVDF including 10% HFP | 100 | ZrO$_2$ | 100 | 500 | Unfired | Unfired | 71 |

As shown in Table 5, the rechargeable lithium battery cell, that did not comprise a coating layer according to Comparative Example 1, was burned during charging and overcharging at the penetration test, and had very low cycle-life characteristics at a high temperature.

On the contrary, the rechargeable lithium battery cells, according to Examples 1 to 6 including the coating layer, showed excellent cell performance regardless of the kind of inorganic additive. Also, the rechargeable lithium battery cell, including the hydrophobic surface-treated silica according to Example 1, showed better cycle-life characteristics at high temperatures, as compared with the rechargeable lithium battery cell including the untreated silica according to Example 2, because the hydrophobic surface-treatment layer improves the cycle-life characteristics, at high temperatures.

The positive electrode for a rechargeable lithium battery suppresses side-reactions between the positive electrode and an electrolyte, at a high voltage, and thereby realizes an excellent reliability and stability for a rechargeable lithium battery, at a high temperature.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A positive electrode for a rechargeable lithium battery, comprising:
   a current collector;
   a positive active material layer disposed on the current collector and including a positive active material being capable of intercalating and de-intercalating lithium ions; and
   a coating layer disposed on the positive active material layer, and comprising a binder and an inorganic additive, wherein the binder is a poly(vinylidenefluoride-hexafluoropropylene) copolymer comprising 2 to 16 mole % of hexafluoropropylene.

2. The positive electrode of claim 1, wherein the poly(vinylidenefluoride-hexafluoropropylene) copolymer comprises 6 to 14 mole % of hexafluoropropylene.

3. The positive electrode of claim 1, wherein the inorganic additive is at least one selected from the group consisting of carbon-based materials; oxides including at least one element selected from the group consisting of Al, Si, Sn, Fe, Ba, Zr, Ti, W, V, Mg, and combinations thereof; and combinations thereof.

4. The positive electrode of claim 3, wherein the inorganic additive is selected from the group consisting of graphite, denka black, ketjen black, acetylene black, carbon nanotubes, carbon nanofiber, carbon nanowire, carbon nanoballs, activated carbon, colloidal silica, amorphous silica, fumed silica, colloidal alumina, amorphous alumina, tin oxide, titanium oxide, vanadium oxide, magnesium oxide, titanium sulfide (TiS$_2$), zirconium oxide (ZrO$_2$), iron oxide, iron sulfide (FeS), iron titanate (FeTiO$_3$), barium titanate (BaTiO$_3$), and combinations thereof.

5. The positive electrode of claim 1, wherein the inorganic additive is a hydrophobic surface-treated silica.

6. The positive electrode of claim 5, wherein:
   the hydrophobic surface-treated silica comprises a silica, and a hydrophobic surface-treatment layer disposed on a surface of the silica; and
   the hydrophobic surface-treated layer comprises at least one surface-treatment compound selected from the group consisting of a substituted or unsubstituted silane-based compound, a substituted or unsubstituted siloxane-based compound, a substituted or unsubstituted silazane-based compound, and combinations thereof.

7. The positive electrode of claim 6, wherein the surface treatment compound comprises at least one selected from the group consisting of dimethyldichlorosilane (DDS), polydimethylsiloxane (PDMS), hexamethyldisilazane (HMDS), aminosilane (AS), alkylsilane (RS), octamethylcyclotetrasiloxane, and combinations thereof.

8. The positive electrode of claim 5, wherein the hydrophobic surface-treated silica has aliphatic CH peaks at 2925-2990 cm$^{-1}$ and 2881-2923 cm$^{-1}$, as determined by infrared absorption spectroscopy.

9. The positive electrode of claim 1, wherein the inorganic additive has an average particle diameter of 2000 nm or less.

10. The positive electrode of claim 1, wherein the inorganic additive has an average particle diameter of 5 to 1000 nm.

11. The positive electrode of claim 1, wherein the inorganic additive is included in an amount of 20 to 4000 parts by weight, based on 100 parts by weight of the binder.

12. The positive electrode of claim 1, wherein the inorganic additive is included in an amount of 100 to 2000 parts by weight, based on 100 parts by weight of the binder.

13. The positive electrode of claim 1, wherein the positive active material is a compound selected from the group consisting of the compounds represented by the following Formulas 1 to 24:

$$Li_aA_{1-b}B_bD_2 \quad \text{Formula 1}$$

wherein, in the above formula, $0.95 \leq a \leq 1.1$ and $0 \leq b \leq 0.5$, $$Li_aE_{1-b}B_bO_{2-c}F_c \quad \text{Formula 2}$$

wherein, in the above formula, $0.95 \leq a \leq 1.1$, $0 \leq b \leq 0.5$, and $0 \leq c \leq 0.05$, $$LiE_{2-b}B_bO_{4-c}F_c \quad \text{Formula 3}$$

wherein, in the above formula, $0 \leq b \leq 0.5$ and $0 \leq c \leq 0.05$, $$Li_aNi_{1-b-c}Co_bB_cD_\alpha \quad \text{Formula 4}$$

wherein, in the above formula, $0.95 \leq a \leq 1.1$, $0 \leq b \leq 0.5$, and $0 \leq c \leq 0.05$, $0 < \alpha \leq 2$, $$Li_aNi_{1-b-c}Co_bB_cO_{2-\alpha}F_\alpha \quad \text{Formula 5}$$

wherein, in the above formula, $0.95 \leq a \leq 1.1$, $0 \leq b \leq 0.5$, and $0 \leq c \leq 0.05$, $0 < \alpha < 2$, $$Li_aNi_{1-b-c}Co_bB_cO_{2-\alpha}F_2 \quad \text{Formula 6}$$

wherein, in the above formula, $0.95 \leq a \leq 1.1$, $0 \leq b \leq 0.5$, and $0 \leq c \leq 0.05$, $0 < \alpha < 2$, $$Li_aNi_{1-b-c}Mn_bB_cD_\alpha \quad \text{Formula 7}$$

wherein, in the above formula, $0.95 \leq a \leq 1.1$, $0 \leq b \leq 0.5$, and $0 \leq c \leq 0.05$, $0 < \alpha \leq 2$, $$Li_aNi_{1-b-c}Mn_bB_cO_{2-\alpha}F_\alpha \quad \text{Formula 8}$$

wherein, in the above formula, $0.95 \leq a \leq 1.1$, $0 \leq b \leq 0.5$, $0 \leq c \leq 0.05$, and $0 < \alpha < 2$, $$Li_aNi_{1-b-c}Mn_bB_cO_{2-\alpha}F_2 \quad \text{Formula 9}$$

wherein, in the above formula, $0.95 \leq a \leq 1.1$, $0 \leq b \leq 0.5$, $0 \leq c \leq 0.05$, and $0 \leq \alpha \leq 2$, $$Li_aNi_bE_cG_dO_2 \quad \text{Formula 10}$$

wherein, in the above formula, $0.90 \leq a \leq 1.1$, $0 \leq b \leq 0.9$, $0 \leq c \leq 0.9$, and $0.001 \leq d \leq 0.2$, $$Li_aNi_bCo_cMn_dG_eO_2 \quad \text{Formula 11}$$

wherein, in the above formula, $0.90 \leq a \leq 1.1$, $0 \leq b \leq 0.9$, $0 \leq c \leq 0.5$, $0 \leq d \leq 0.5$, and $0.001 \leq e \leq 0.2$, $$Li_aNiG_bO_2 \quad \text{Formula 12}$$

wherein, in the above formula, $0.90 \leq a \leq 1.1$ and $0.001 \leq b \leq 0.1$, $$Li_aCoG_bO_2 \quad \text{Formula 13}$$

wherein, in the above formula, $0.90 \leq a \leq 1.1$ and $0.001 \leq b \leq 0.1$, $$Li_aMnG_bO_2 \quad \text{Formula 14}$$

wherein, in the above formula, $0.90 \leq a \leq 1.1$ and $0.001 \leq b \leq 0.1$, $$Li_aMn_2G_bO_4 \quad \text{Formula 15}$$

wherein, in the above formula, $0.90 \leq a \leq 1.1$ and $0.001 \leq b \leq 0.2$, $$QO_2, \quad \text{Formula 16}$$

$$QS_2, \quad \text{Formula 17}$$

$$LiQS_2, \quad \text{Formula 18}$$

$$V_2O_5, \quad \text{Formula 19}$$

$$LiV_2O_5, \quad \text{Formula 20}$$

$$LiIO_2, \quad \text{Formula 21}$$

$$LiNiVO_4, \quad \text{Formula 22}$$

$$Li_{3-f}J_2(PO_4)_3 (0 \leq f \leq 3), \text{ and} \quad \text{Formula 23}$$

$$Li_{3-f}Fe_2(PO_4)_3 (0 \leq f \leq 2), \quad \text{Formula 24}$$

wherein, A is selected from the group consisting of Ni, Co, Mn, and combinations thereof; B is selected from the group consisting of Al, Ni, Co, Mn, Cr, Fe, Mg, Sr, V, a rare earth element, and combinations thereof; D is selected from the group consisting of O, F, S, P, and combinations thereof; E is selected from the group consisting of Co, Mn, and combinations thereof; F is selected from the group consisting of F, S, P, and combinations thereof; G is a transition element or a lanthanide element selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, Fe, La, Ce, Sr, and combinations thereof; Q is selected from the group consisting of Ti, Mo, Mn, and combinations thereof; I is selected from the group consisting of Cr, V, Fe, Sc, Y, and combinations thereof; and J is selected from the group consisting of V, Cr, Mn, Co, Ni, Cu, and combinations thereof.

14. The positive electrode of claim 1, wherein the positive electrode has an active mass density of at least 3.5 g/cc.

15. A rechargeable lithium battery comprising:
a positive electrode;
a negative electrode comprising a negative active material to intercalate and de-intercalate lithium ions; and
a non-aqueous electrolyte comprising a non-aqueous organic solvent and a lithium salt,
wherein the positive electrode comprises,
a current collector,
a positive active material layer disposed on the current collector, and comprising a positive active material to intercalate and de-intercalate lithium ions, and
a coating layer disposed on the positive active material layer, and comprising a binder and an inorganic additive, wherein the binder is a poly(vinylidenefluoride-hexafluoropropylene) copolymer comprising 2 to 16 mole % of hexafluoropropylene.

* * * * *

UNITED STATES PATENT AND TRADEMARK OFFICE
CERTIFICATE OF CORRECTION

PATENT NO. : 7,923,149 B2  
APPLICATION NO. : 11/940042  
DATED : April 12, 2011  
INVENTOR(S) : Duck-Chul Hwang et al.

Page 1 of 1

It is certified that error appears in the above-identified patent and that said Letters Patent is hereby corrected as shown below:

In the Claims

Column 35, Claim 13,     Delete "$Li_aN_{1-b-c}C_bB_cO_{2-\alpha}F_2$"  
combined lines 46-47, Formula 6.     Insert -- $Li_aN_{1-b-c}Co_bB_cO_{2-\alpha}F_2$ --

Signed and Sealed this  
Nineteenth Day of June, 2012

David J. Kappos  
*Director of the United States Patent and Trademark Office*